(12) United States Patent
De Los Santos et al.

(10) Patent No.: US 9,132,806 B2
(45) Date of Patent: Sep. 15, 2015

(54) REMOTE START SYSTEM FOR A MOTOR VEHICLE

(71) Applicant: GENERAL MOTORS LLC, Detroit, MI (US)

(72) Inventors: Hanly De Los Santos, Royal Oak, MI (US); Anthony J. Sumcad, Troy, MI (US)

(73) Assignee: General Motors LLC, Detroit, MI (US)

( * ) Notice: Subject to any disclaimer, the term of this patent is extended or adjusted under 35 U.S.C. 154(b) by 111 days.

(21) Appl. No.: 13/929,089

(22) Filed: Jun. 27, 2013

(65) Prior Publication Data

US 2015/0005984 A1    Jan. 1, 2015

(51) Int. Cl.
| | |
|---|---|
| G05D 1/00 | (2006.01) |
| B60R 25/33 | (2013.01) |
| B60R 25/04 | (2013.01) |
| H04W 4/04 | (2009.01) |
| G08G 1/00 | (2006.01) |
| B60K 31/02 | (2006.01) |
| G07C 5/00 | (2006.01) |
| B64C 39/02 | (2006.01) |

(52) U.S. Cl.
CPC ............. *B60R 25/33* (2013.01); *B60K 31/02* (2013.01); *B60R 25/04* (2013.01); *G08G 1/207* (2013.01); *H04W 4/046* (2013.01); *B64C 39/024* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 2011/0050164 A1* | 3/2011 | Partovi et al. | 320/108 |
| 2011/0063138 A1* | 3/2011 | Berkobin et al. | 340/988 |
| 2011/0086668 A1 | 4/2011 | Patel | |
| 2012/0100806 A1* | 4/2012 | Hall | 455/41.2 |
| 2013/0157640 A1* | 6/2013 | Aycock | 455/418 |
| 2014/0091903 A1* | 4/2014 | Birkel et al. | 340/5.54 |

* cited by examiner

*Primary Examiner* — Mussa A Shaawat
(74) *Attorney, Agent, or Firm* — Dierker & Associates, P.C.

(57) ABSTRACT

Vehicle remote start system includes a vehicle power plant (VPP) connected to a starting system (SS) and a geographic location system. Starting system includes a geo-bounded on state electrically enabling the VPP to provide tractive power to a drive wheel as long as the vehicle remains within a predetermined geographical boundary (PGB), a geo-bounded off state electrically disabling the VPP from providing tractive power to the drive wheel or another drive wheel when the vehicle is outside the PGB, and a normal state overriding off and on states to electrically enable the VPP to provide tractive power to the drive wheel(s). Hardware key must be within a predetermined distance of the starting system for the normal state, but is not required for the on state. Starting system enters the on state only in response to an authenticated start command from a smart phone in communication with starting system's authentication system.

16 Claims, 2 Drawing Sheets

REMOTE START SYSTEM FOR A MOTOR VEHICLE

TECHNICAL FIELD

The present disclosure relates generally to a remote start system for a motor vehicle.

BACKGROUND

Some vehicles are started using mechanical keys. Other vehicles are started when an in-vehicle button is pressed while at the same time the presence of a hardware key is detected within the vehicle. Still other vehicles are configured to be started in a variety of different ways. For example, a vehicle may be started with a mechanical key or may be started remotely using a key fob or other electronic device.

SUMMARY

A remote start system for a motor vehicle includes a vehicle power plant and an electronic vehicle geographic location system disposed in the motor vehicle. A starting system is connected to the vehicle power plant and is in communication with the electronic vehicle geographic location system. The starting system includes a geo-bounded on state electrically enabling the vehicle power plant to provide tractive power to a vehicle drive wheel as long as the motor vehicle remains within a predetermined geographical boundary; a geo-bounded off state electrically disabling the vehicle power plant from providing tractive power to the vehicle drive wheel or another vehicle drive wheel when the motor vehicle is not within the predetermined geographical boundary; and a normal state overriding the geo-bounded off state and the geo-bounded on state to electrically enable the vehicle power plant to provide tractive power to the vehicle drive wheel. A hardware key must be within a predetermined distance of the starting system for the starting system to be in the normal state, but the hardware key is not required for the starting system to enter the geo-bounded on state. The system also includes a smart phone in electromagnetic communication with an authentication system of the starting system, wherein the starting system enters into the geo-bounded on state only in response to an authenticated start command from the smart phone.

A method for starting a motor vehicle is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the system and method disclosed herein include and utilize an in-vehicle starting system that is operatively coupled to a smart phone. The starting system electrically enables a vehicle power plant to provide tractive power to one or more vehicle drive wheels when in a geo-bounded on state, and electrically inhibits the vehicle power plant from providing tractive power to one or more vehicle drive wheels when in a geo-bounded off state. To enter the geo-bounded on state, a hardware key is not required, but an authenticated start command must be received at the starting system from the smart phone. While in the geo-bounded on state, if the vehicle travels outside some predetermined geographical boundary, the starting system will initiate a transition to the geo-bounded off state, and the vehicle will ultimately become inoperable. As such, the system and method disclosed herein introduce geographically limited driving capabilities in the absence of the hardware key.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, the term "communication" is to be construed to include all forms of communication, including direct and indirect communication. As such, indirect communication may include communication between two components with additional component(s) located therebetween.

Figure 1:
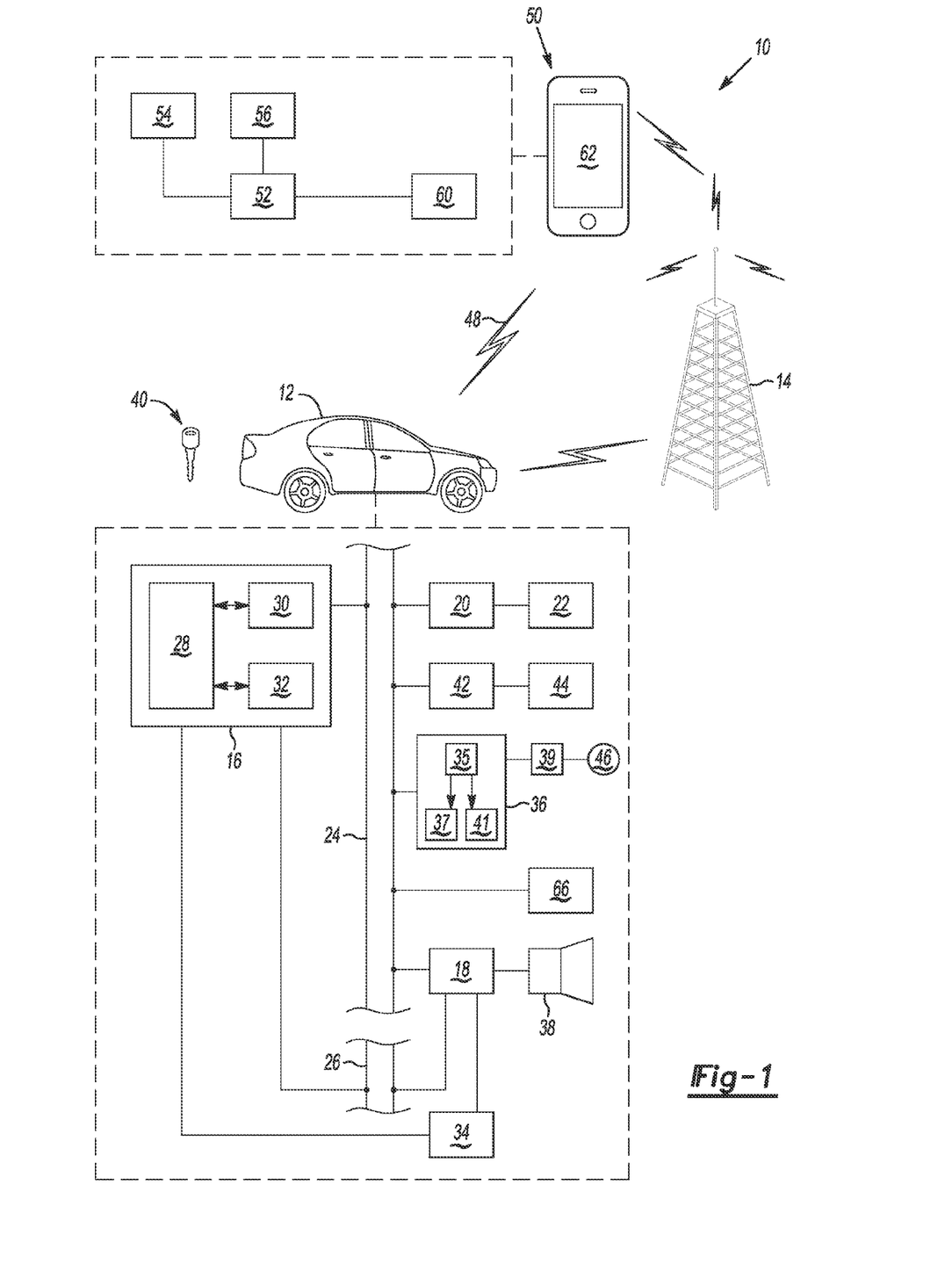
FIG. 1 is a schematic view of an example of a system for remotely starting a motor vehicle.

FIG. 1 depicts an example of a system 10 for starting a motor vehicle 12. The motor vehicle 12 is a vehicle, such as a car, motorcycle, truck, recreational vehicle (RV), boat, plane, etc., and is equipped with suitable hardware and computer-readable instructions/code that enable it to communicate (e.g., transmit and/or receive voice and data communications) over a carrier/communication system and/or using a short-range wireless communication link 48.

In an example, the carrier/communication system is a two-way radio frequency communication system. The carrier/communication system may include one or more cell towers 14. While not shown, it is to be understood that the carrier/communication system may also include one or more base stations and/or mobile switching centers (MSCs) (e.g., for a 2G/3G network), one or more evolved Node Bs (eNodeB) and evolved packet cores (EPC) (for a 4G (LTE) network), one or more service providers including mobile network operator(s), and/or one or more land networks. The carrier/communication system is part of a cellular radio environment, which may include a variety of wireless network providers utilizing the same or a variety of radio access technologies.

The wireless carrier/communication system may be used to establish communication between an in-vehicle telematics unit 16 or an in-vehicle infotainment unit 18 and any outside communications device or system (e.g., a mobile/smart phone 50, a landline telephone, communication component(s) at a call center, etc.). In an example, the in-vehicle telematics unit 16 or the in-vehicle infotainment unit 18 includes a cellular chipset/component that may be an analog, digital, dual-mode, dual-band, multi-mode and/or multi-band cellular phone. The cellular chipset-component uses one or more prescribed frequencies in standard analog and/or digital bands in the current market for cellular systems. Any suitable protocol may be used, including digital transmission technologies, such as TDMA (time division multiple access), CDMA (code division multiple access), and FDMA (frequency-division multiple access). The architecture of the wireless carrier/communication system may be GSM (global system for mobile telecommunications), CDMA2000, UMTS (universal mobile telecommunications system), or LTE (long-term evolution).

Some vehicle communications (e.g., between the vehicle 12 and the smart phone 50 or call center (not shown)) utilize radio transmissions to establish a voice channel with the carrier/communication system such that both voice and data transmissions may be sent and received over the voice channel. In some instances, vehicle communications are enabled via the cellular chipset/component for voice communications and a wireless modem for data transmission. In order to enable successful data transmission over the voice channel, wireless modem applies some type of encoding or modulation to convert the digital data so that it can communicate through a vocoder or speech codec incorporated in the cellular chipset/component. It is to be understood that any suitable encoding or modulation technique that provides an acceptable data rate and bit error may be used with the examples disclosed herein.

The in-vehicle telematics unit 16 or an in-vehicle infotainment unit 18 may also be configured for short-range wireless communication technologies, such as BLUETOOTH®, dedicated short-range communications (DSRC), or Wi-Fi. In these instances, the cellular chipset/component may operate in conjunction with a short-range wireless communication unit of the telematics unit 16 or infotainment unit 18. Short-range wireless communications may be suitable for communication between, for example, the unit 16 or 18 and the smart phone 50. Use of short-range wireless communication technologies will depend, at least in part, on the distance of the vehicle 12 from the smart phone 50. Wi-Fi may be more desirable when the distances are slightly longer than those distances for which BLUETOOTH® and dedicated short-range communications (DSRC) are used.

Overall, the in-vehicle telematics unit 16 is an on-board vehicle dedicated communications device that also includes hardware components that are capable of running computer-readable instructions/code, which are embodied on non-transitory, tangible computer-readable media. In any of the examples disclosed herein, the computer-readable media may include any one of many physical media such as, for example, electronic, magnetic, optical, electromagnetic, or semiconductor media. More specific examples of suitable computer-readable media include hard drives, a random access memory (RAM), a read-only memory (ROM), an erasable programmable read-only memory (EPROM), or a portable CD, DVD, or flash drive.

The in-vehicle telematics unit 16 may provide a variety of services, both individually and through its communication with the call center (e.g., a facility that may be owned and operated by an in-vehicle telematics service provider). Several examples of these services include, but are not limited to: turn-by-turn directions and other navigation-related services provided in conjunction with Global Position System (GPS) based chipset/component; airbag deployment notification and other emergency or roadside assistance-related services provided in connection with various crash and/or collision sensor interface modules 20 and sensors 22 located throughout the vehicle 12; and infotainment-related services where music, Web pages, movies, television programs, videogames and/or other content is downloaded by the infotainment unit 18 operatively connected to the telematics unit 16 via a vehicle bus system 24 and an audio bus system 26. The listed services are by no means an exhaustive list of all the capabilities of the telematics unit 16, but are simply an illustration of some of the services that the in-vehicle telematics unit 16 is capable of offering.

While shown as separate components, it is to be understood that in one example, the telematics unit 16 and the starting system 36 are integrated into the same unit.

The telematics unit 16 generally includes an electronic processing device 28 operatively coupled to one or more types of electronic memory 30 and an electronic vehicle geographic location system 32. In an example, the electronic processing device 28 is a micro-processor. In other examples, the electronic processing device 28 may be a micro controller, a controller, a host processor, and/or a vehicle communications processor. In another example, electronic processing device 28 may be an application specific integrated circuit (ASIC). Alternatively, electronic processing device 28 may be a processor working in conjunction with a central processing unit (CPU) performing the function of a general-purpose processor. In an example, the electronic processing device 28 is capable of running software programs having computer-readable code/instructions to initiate and/or perform one or more steps of the method disclosed herein. As examples, the electronic processing device 28 is capable of running computer-readable code for recognizing the smart phone 50 and for unlocking the vehicle 12.

The electronic memory 30 of the telematics unit 16 may be an encrypted memory that is configured to store data and computer-readable instructions/code to be executed by the processor 28, including instructions for generating a passphrase to be sent to the smart phone 50 and/or for verifying a passphrase received on an in-vehicle display 34.

The electronic vehicle geographic location system 32 is a location detection chipset/component that may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection chipset/component may also include, for example, Glonass (i.e., global navigation satellite system), Sbas (i.e., satellite-based augmentation systems), or a D-GPS (differential global positioning system). The electronic vehicle geographic location system 32 may be used to recognize that the vehicle 12 has exceeded the predetermined geographical boundary (PGB) associated with the geo-bounded on state. The electronic vehicle geographic location system 32 is in communication with a starting system 36 (e.g., through the vehicle bus 24), and can transmit signal(s) to the starting system 36 that are indicative of the position of the vehicle 12 and/or that inform the starting system 36 that the vehicle 12 has exceeded the predetermined geographical boundary.

While not shown, it is to be understood that the in-vehicle telematics unit 16 may also include the previously mentioned cellular chipset/component, the previously mentioned short-range wireless communication unit (e.g., a BLUETOOTH® unit), the previously mentioned wireless modem, a navigation unit containing the previously mentioned electronic vehicle geographic location system 32, a real-time clock (RTC), a short-range wireless antenna, and/or a dual mode antenna. Generally, dual mode antenna services the location detection chipset/component and the cellular chipset/component. It is to be understood that the in-vehicle telematics unit 16 may be implemented without one or more of the above listed components (e.g., the real-time clock). It is to be further understood that in-vehicle telematics unit 16 may also include additional components and functionality as desired for a particular end use.

The real-time clock (RTC) provides accurate date and time information to the in-vehicle telematics unit 16 hardware and software components that may require and/or request date and time information. In an example, the RTC may provide date and time information periodically, such as, for example, every ten milliseconds.

The telematics unit 16 and the infotainment unit 18 are also operatively connected to the vehicle bus system 24. The vehicle bus system 24 may utilize a variety of networking protocols, such as a controller area network (CAN), a media oriented system transfer (MOST), a local interconnection network (LIN), an Ethernet or TCP/IP, and other appropriate connections such as those that conform with known ISO, SAE, and IEEE standards and specifications, to name a few. The vehicle bus system 24 enables the vehicle 12 to send signals (i.e., real-time bus messages) from the unit 16 and/or 18 to various units of equipment and systems both outside the vehicle 12 and within the vehicle 12 to perform or initiate various functions, such as signaling the starting system module 36 to switch between the engaged and disengaged states, unlocking a door, executing personal comfort settings, and/or the like. The vehicle bus system 24 also enables the vehicle 12 to receive signals at the units 16, 18 from various units of equipment and systems both outside the vehicle 12 and within the vehicle 12.

It is to be understood that the infotainment unit 18 may include any of the communication components previously described and may also include its own electronic processing unit and memory. The infotainment unit 18 includes an audio component that receives analog information, rendering it as sound, via the audio bus system 26. Digital information is received at the infotainment unit 18 via the vehicle bus system 24. The audio component provides AM and FM radio, satellite radio, CD, DVD, multimedia and other like functionality, in conjunction with a controller/processor of the infotainment unit 18. The infotainment unit 18 may contain a speaker system, or may utilize vehicle speaker 38 via arbitration on vehicle bus system 24 and/or audio bus system 26.

The vehicle 12 may also include a display 34. The display 34 may be operatively directly connected to or in communication with the telematics unit 16, and/or may be operatively directly connected to or in communication with the infotainment unit 18. In an example, the display 34 may be used to display navigation instructions and other messages to the in-vehicle occupant(s). Examples of the display 34 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As illustrated in FIG. 1, the vehicle 12 may also include other vehicle systems that are connected to the vehicle bus system 24. Examples of these other vehicle systems may include the crash and or collision sensors 22 and other vehicle sensors 44. The crash sensors 22 provide information to the telematics unit 16 via the crash and/or collision detection sensor interface 20 regarding the severity of a vehicle collision, such as the angle of impact and the amount of force sustained. The other vehicle sensors 44, connected to various sensor interface modules 42, are also operatively connected to the vehicle bus system 24. Examples of the other vehicle sensors 44 include, but are not limited to, key detecting sensors, gyroscopes, accelerometers, magnetometers, emission detection and/or control sensors, lane departure sensors (e.g., video sensors, laser sensors, infrared sensors, etc.), speed sensors, following distance sensors (e.g., radar sensors, video sensors, infrared sensors, ultrasonic sensors, etc.), braking activity sensors, environmental detection sensors, and/or the like. Examples of the sensor interface modules 42 include powertrain control module, climate control, body control, and/or the like.

The vehicle 12 also includes the starting system 36, which is operatively connected to at least the vehicle bus system 24, the vehicle power plant 39, and one or more vehicle drive wheels 46. In some examples, the starting system 36 is integrated with the telematics unit 16 and includes a single processing unit 28 and memory 30. In other examples (as shown in FIG. 1), the starting system 36 may include its own electronic processing unit 35 and memory 37 that are separate from the components of the telematics unit 16. The electronic processing unit 35 (or 28 if the starting system 36 and telematics unit 16 are a single component) is capable of executing computer-readable code/instructions for initiating the states of the starting system 36.

As will be discussed in more detail below, the starting system 36 enables the vehicle power plant 39 (e.g., an internal combustion engine, a hybrid engine, an electric motor, a fuel cell in combination with an electric motor, or combinations thereof) to provide or not provide tractive power to the vehicle drive wheel(s) 46, depending upon the state the starting system 36 is in. The starting system 36 is capable of switching between multiple states, including the geo-bounded on state, the geo-bounded off state, and the normal state.

In the geo-bounded on state, the starting system 36 electrically enables the vehicle power plant 39 to provide tractive power to the vehicle drive wheel(s) 46 as long as the vehicle 12 remains within a predetermined geographical boundary. It is to be understood that once the starting system 36 is in the geo-bounded on state, the starting system 36 remains in this state until the vehicle 12 travels outside the predetermined geographical boundary or the vehicle 12 is put into park mode. When the vehicle 12 travels outside the predetermined geographical boundary, the starting system 36 may enter a transition state, which is a precursor to the geo-bounded off state. When the vehicle 12 is put into park mode, the vehicle power plant 39 may be shut down and the starting system 36 may enter into an idle or off state, where tractive power is not enabled and the system 36 is set to detect the presence (or absence) of the hardware key 40.

Upon being placed into park mode, a prompt (audio or visual menu) to wait or power down the vehicle 12 may be presented to the driver. If the menu option to "wait" is selected, the audio or visual menu may be presented again to the driver after a predetermined time. If the "power down" menu option is not selected within a predetermined time, the "wait" option may be automatically selected by default. In another example, if the "wait" menu option is not selected within a predetermined time, the "power down" menu option may be automatically selected by default.

The predetermined geographical boundary may be preset and stored in the memory (e.g., memory 30 or memory 37) that is operatively connected to the electronic vehicle geographic location system 32. The predetermined geographical boundary is defined by geographic parameter(s) that set a limit on how far and/or where the vehicle 12 may travel while in the geo-bounded on state. The geographic parameters may include any parameters that are recognizable by the electronic vehicle geographic location system 32, including latitude, longitude, altitude, etc. The predetermined geographical boundary may be static, which does not take into account the then-current position of the vehicle 12. For example, the predetermined geographical boundary may be defined by the limits of a particular city, town, etc. The predetermined geographical boundary may also be dynamic, which does take into account the then-current position of the vehicle 12. As one example, the predetermined geographical boundary may be set to be any predetermined number of miles (e.g., 5, 10, etc.) from the position of the vehicle 12 when the geo-bounded on state is entered. As another example, the predetermined geographical boundary may be set to be a particular route (which is generated in real time and provided to the vehicle user, e.g., on the display 34) from the position of the vehicle 12 when the geo-bounded on state is entered to the garage address associated with the vehicle 12. The predetermined geographic boundary is set, or the parameters for dynamically determining the geographic boundary are set, so that the vehicle user is able to drive the vehicle 12 some distance or to some destination without the hardware key 40.

The vehicle speed may also be limited to a predetermined maximum speed when the starting system 36 is in the geo-bounded on state. As an example, the maximum speed may be set to 50 mph or less. The maximum speed may initially be set by the manufacturer but may be altered by the vehicle owner using a webpage associated with the vehicle manufacturer or using a menu on the in-vehicle display 34. The maximum speed may be configurable as part of the initial command into the geo-bounded on state. The vehicle owner may also choose to disable this feature of the geo-bounded on state, and thus vehicle speed may not be limited when the starting system 36 is in the geo-bounded on state.

As will be described in more detail in reference to FIG. 2, the starting system 36 is capable of entering the geo-bounded on state only in response to an authenticated start command from the smart phone 50. A hardware key 40 (e.g., a key fob) is not required for the vehicle 12 to enter the geo-bounded on state. In many instances, the starting system 36 enters the geo-bounded on state after the starting system 36 fails to recognize the presence of the hardware key 40 and receives the authenticated start command from the smart phone 50.

In the geo-bounded off state, the starting system 36 electrically inhibits the vehicle power plant 39 from providing tractive power to the vehicle drive wheel(s) 46. The geo-bounded off state is entered after the vehicle 12 travels outside of the predetermined geographic boundary. The electronic vehicle geographic location system 32 continuously monitors the then-current position of the vehicle 12. The position coordinates may be transmitted at predetermined intervals to the processor 28 or 35, at least while the starting system 36 is in the geo-bounded on state. The processor 28 or 35, executing computer-readable code, compares the received then-current position coordinates with the predetermined geographic boundary to determine if vehicle 12 is outside of, has exceed, or has varied from the predetermined geographic boundary.

When the processor 28 or 35 recognizes that the vehicle 12 has traveled outside of, has exceeded, or has otherwise varied from the predetermined geographic boundary, the processor 28 or 35 switches from the geo-bounded on state to the geo-bounded off state. It is to be understood that upon initiating the switch to the geo-bounded off state, the starting system 36 may enter a transition state. The transition state delays entry of the geo-bounded off state until a predetermined condition is met. The predetermined condition may include providing an alert/warning in the vehicle 12 so that the driver of the vehicle 12 is made aware that the geographical boundary has been exceeded and/or is given notice that tractive power to the vehicle power plant 39 is being disabled. The alert may be a visual alert displayed on the display 34, an audible alter played over the speaker 38, and/or a haptic alert that is generated through the steering wheel, seat, etc. This predetermined condition may give the driver time to park the vehicle 12 before the vehicle power plant 39 is completely shut down. Another example of the predetermined condition includes flashing the vehicle's external hazard lights. This predetermined condition may warn other drivers that something is going on with the vehicle 12. In the transition state, the vehicle 12 speed may be automatically reduced until the vehicle 12 stops. This allows the vehicle 12 to move from the geo-bounded on state to the geo-bounded off state smoothly.

As mentioned above, the starting system 36 also has a normal mode. The normal mode overrides both the geo-bounded on and off states. The normal mode can only be entered when the hardware key 40 is within a predetermined distance of the starting system 36 (i.e., a distance suitable for starting the vehicle 12 using the hardware key 40). In an example, when the presence of the hardware key 40 is detected and the hardware key 40 is used to start the vehicle 12, the starting system 36 automatically enters the normal mode. In the normal mode, the starting system 36 electrically enables the vehicle power plant 39 to provide tractive power to the vehicle drive wheel(s) 46 without any geographic limitations.

In addition to its various states, the starting system 36 also includes an authentication system 41 that may be in communication with the smart phone 50. The authentication system 41 includes hardware and/or software for recognizing the presence of the smart phone 50, for blocking transmission of the authenticated start command prior to recognizing the smart phone 50 (i.e., a block mode), and for transmitting the authenticated start command to the vehicle 12 after the smart phone 50 is recognized. The authentication system 41 will be discussed further in reference to FIG. 2.

As mentioned above, some examples of the system 10 also include the smart phone 50, such as a GSM/LTE phone or a GSM/CDMA/LTE phone. The smart phone 50 includes physical hardware and software. Some examples of the smart phone 50 components include a processor 52 (which is similar to processor 28), a memory 54, and a wireless communications module 56. The processor 52 is configured to run software 60, including computer readable code/instructions stored on the memory 54 (i.e., a non-transitory, tangible computer readable medium, including an encrypted memory), and application(s) that are downloaded and stored on the memory 54. The computer readable code/instructions may be for verifying a passphrase received on a screen 62, and/or for performing other steps of the methods. The wireless communications module 56 may be used to transmit data to the vehicle 12 (e.g., using a short-range wireless communication link 48).

The smart phone 50 also includes a screen 62, which may be used to display a passphrase and/or to receive an entered passphrase. The screen 62 may be a touchscreen that can have a word, sequence of numbers and/or letters, a pattern, etc. traced or otherwise entered thereon.

The smart phone 50 also has a unique identifying code that is used to pair the smart phone with the telematics unit 16 and/or the infotainment unit 18 and/or the starting system 36. The smart phone 50 and the telematics unit 16 or infotainment unit 18 or starting system 36 are paired when the devices 50 and 16 or 50 and 18 or 50 and 36 exchange unique identifying codes with each other. This enables the telematics unit 16 or infotainment unit 18 or starting system 36 and the smart phone 50 to communicate typically under a secured connection. As a more specific example, initial pairing may involve setting the smart phone 50 to a short range wireless discovery mode (such as by selecting, on the phone 50, a discovery mode function as a menu option, icon, or the like). While in the discovery mode, other devices having a short range wireless communication unit (such as the telematics unit 16, the infotainment unit 18, or the starting system 36) are allowed to detect the presence of the smart phone 50. When the telematics unit 16 or infotainment unit 18 or starting system 36 locates the smart phone 50, the smart phone 50 automatically provides the type of device it is (e.g., a cellular phone) and its short range wireless connection name. The smart phone 50 may then prompt the user to enter a security code/password, and then the unique identifying code of the smart phone 50 is sent to the telematics unit 16 or infotainment unit 18. Upon receiving the unique identifying code, the telematics unit 16 or infotainment unit 18 or starting system 36 sends its own unique identifying code to the smart phone 50 to ultimately pair the two devices 16, 50 or 18, 50 together.

When initially pairing the smart phone 50, the user may be prompted (e.g., by the phone 50 or on the in-vehicle display 34) to add the paired smart phone 50 to a list of authorized smart phones. This list may be stored in the vehicle 12 (e.g., in memory 30, 37, etc.). By adding the unique identifying code of the paired smart phone 50 to the list, the user is telling the vehicle 12 that the smart phone 50 is authorized to give the authenticated start command in order to enter the geo-bounded on state. After the smart phone 50 is added to the list, the vehicle 12 (i.e., the processor 28, 35, etc.) will be able to verify the authenticity of the smart phone 50 during subsequent communications with the smart phone 50 simply by checking the list.

Once the two units 16, 50 or 18, 50 or 36, 50 have been paired and whenever within short-range wireless communication range of each other, the smart phone 50 can directly communicate with the telematics unit 16, the infotainment unit 18, or the starting system 36. It is to be understood that the telematics unit 16, the infotainment unit 18, or starting system 36 may be capable of connecting to a plurality of different short-range wireless communication devices. In an example, the plurality of different short-range wireless communications may be up to eight different short-range wireless communication devices.

Figure 2:
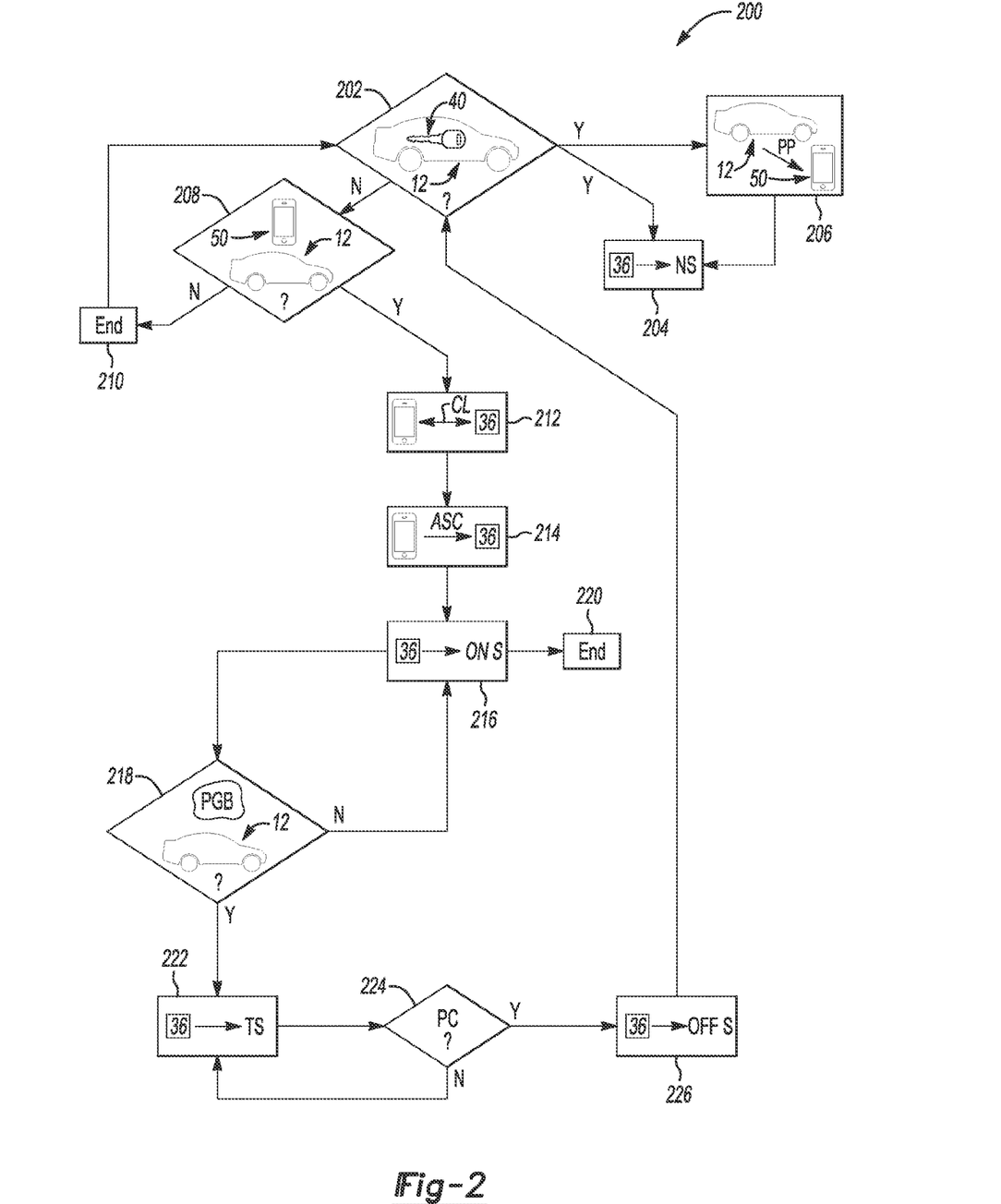
FIG. 2 is a schematic flow diagram illustrating an example of a method for remotely starting a motor vehicle.

FIG. 2 is a flow diagram illustrating examples of the method for starting a motor vehicle 12 using components of the system 10. The example methods shown in FIG. 2 utilize the system 10 to provide limited vehicle 12 operation when the hardware key 40 is not present.

The method 200 includes recognizing whether the hardware key 40 is physically present in or within a predetermined distance of the motor vehicle 12 (reference numeral 202). The presence of the hardware key 40 may be recognized by one of the sensors 44. In some examples when the hardware key 40 is detected, the vehicle door(s) may be unlocked. The presence of the hardware key 40 also causes the sensor 55 to transmit a key present signal to the starting system 36. In response, the starting system 36 may enter the normal state NS, as shown at reference numeral 204, and the vehicle 12 may be driven without any geographical limitations being imposed during the driving event.

In another example, the hardware key 40 is present and the method moves to step 206, where the vehicle 12 (e.g., processor 28 or 35) generates and transmits a passphrase PP to a smart phone 50 that has established a connection with the vehicle 12 and is on the list of authorized smart phones (as determined by the processor 28 or 35).

Prior to passphrase PP generation and transmission, the telematics unit 16 or the infotainment unit 18 or the starting system 36 will attempt to connect to the smart phone 50 over a short-range wireless communication link. As discussed above, after the initial pairing, the smart phone 50 will be stored in a list of authorized smart phones in the memory 30 or 37. In an example, the telematics unit 16 or the infotainment unit 18 or the starting system 36 will attempt to simultaneously connect with a plurality of phones in the list, or will attempt to sequentially connect with each of the smart phones in the list. In an example, the starting system 36 will attempt to simultaneously connect with up to eight phones in the list. In another example, the starting system 36 will attempt to simultaneously connect with up to 16 phones in the list. During sequential attempts, the connection attempt may begin with, for example, the phone on the list that most recently connected to the vehicle 12 or the phone that is marked as the primary phone for the vehicle 12. It is to be understood that once a successful connection is made, further attempts for connection will cease. After the connection is made, the passphrase PP is generated at the vehicle 12 and is transmitted to the smart phone 50.

In this example, prior to entering the normal state NS, the starting system 36 must receive (e.g., at the processor 35) the passphrase PP that was transmitted to the smart phone 50. This passphrase PP functions as a different type of authenticated start command, which allows the starting system 36 to enter the normal state NS. More particularly, the user of the smart phone 50 will receive a text message or an application message which includes the passphrase PP. The user then sends a reply message (including the passphrase PP) to the vehicle 12, or enters the passphrase PP at the vehicle 12 by virtue of the display 34. When the passphrase PP is received at the vehicle 12, the starting system 36 may enter the normal state NS, as shown at reference numeral 204, and the vehicle 12 may be driven without any geographical limitations being imposed during the driving event. In this example, the use of the smart phone 50 and the passphrase is an additional security measure in allowing vehicle operation without any geographic limitation.

When the hardware key 40 is not recognized at the vehicle 12, the vehicle 12 attempts to verify the physical presence of the smart phone 50, as shown at reference numeral 208. When the smart phone 50 is not detected, the method 200 ends, as shown at reference numeral 210, until the hardware key 40 is recognized or the smart phone 50 is recognized and verified.

Recognizing the presence of the smart phone 50 may be accomplished using the authentication system 41 of the starting system 36. The telematics unit 16, infotainment unit 18, or the starting system 36 will attempt to establish a connection with the smart phone 50 using short-range wireless communication as discussed above. If the connection is made via the telematics unit 16 or the infotainment unit 18, either of these units 16, 18 may transmit the unique identifying code of the smart phone 50 to the processor 35 to determine whether the smart phone 50 is on the authorized phone list. When the telematics unit 16 and the starting system 36 are a single device, the processor 28 may perform smart phone recognition. The processor 28 or 35 is capable of running computer-readable code for comparing the received code with previously stored codes to determine if the smart phone 50 has been listed as an authorized smart phone 50. If the smart phone 50 is not on the list, the method will end (as shown at reference numeral 210) until the hardware key 40 is recognized or another smart phone 50 is recognized and verified.

If the smart phone 50 is recognized as being on the list of authorized phones, the short range connection will be at least temporarily allowed and the method will continue. In response to the recognition of the presence of the authorized smart phone 50, the vehicle 12 may unlock its doors. In some examples, the verification of the smart phone 50 may be complete at this point. In these examples, the method will move directly to step 212 where the communication link CL between the phone 50 and the vehicle 12 (e.g., the starting system 36) is allowed to continue.

In other examples of the method 200, after the connection is established and the vehicle door(s) have been unlocked, verification of the smart phone 50 may include additional step(s) involving a passphrase PP (not shown in FIG. 2). When the passphrase PP is utilized for further verification of the smart phone 50, it is to be understood that the starting system 36 is in a block mode, and the transmission of any authenticated start command is blocked until passphrase verification is complete.

In one example, a request for authorization is transmitted from the processor 35 or 28 to the smart phone 50 after the phone 50 is recognized as being on the pre-authorized phone list. This authorization request may include the passphrase PP. As described above, the user of the smart phone 50 may receive a text message or an application message which includes the passphrase PP. The user then sends a reply message (including the passphrase PP) to the vehicle 12 using the smart phone 50, or enters the passphrase PP at the vehicle 12 by virtue of the display 34. In this example, the passphrase PP received at the vehicle 12 is compared to the passphrase PP that was transmitted to the smart phone 50. When the passphrases PP match, the physical presence of the smart phone 50 is verified. The method will move to step 212 where the communication link CL between the phone 50 and the vehicle 12 (e.g., the starting system 36) is allowed to continue.

In another example, a request for authorization is displayed in the vehicle 12 on the display 34 after the phone 50 is recognized as being on the pre-authorized phone list. This authorization request may include the passphrase PP. In this authorization request, the user is prompted to enter the passphrase PP on the smart phone 50. When entered on the smart phone 50, the passphrase PP is transmitted from the phone 50 to the starting system 36. If the passphrase PP received from the phone 50 matches the passphrase PP that was displayed on the display 34, the physical presence of the smart phone 50 is verified by the vehicle 12. The method will move to step 212 where the communication link CL between the phone 50 and the vehicle 12 (e.g., the starting system 36) is allowed to continue.

In another example, the call center may intervene in the communication between the smart phone 50 and the vehicle 12. In such an example, the smart phone 50 may be capable of SMS (short messaging service, e.g., text messaging), however, the smart phone 50 may not be able to run apps that would be typically found on full-featured smart phones. Such a smart phone 50 would receive the passphrase PP, e.g. via SMS. After receiving the passphrase PP, the user may enter the passphrase PP at the vehicle 12 via the display 34. If the passphrase PP entered on the display 34 matches the passphrase that was sent to the smart phone 50, the physical presence of the smart phone 50 is verified by the vehicle 12.

In any instance where the physical presence of the smart phone 50 is verified, the blocked mode is overridden, and the smart phone 50 may be used to transmit the authenticated start command ASC from the smart phone 50 to the starting system 36 of the vehicle 12. After verification of the smart phone 50, the authenticated start command ASC may automatically be transmitted to the vehicle 12, or the smart phone user may be prompted (by the phone 50) to initiate the transmission of the authenticated start command. The authenticated start command ASC may be transmitted directly from the smart phone 50 to the starting system 36. In another example, the authenticated start command ASC may be verbally initiated via the smart phone 50 in voice communication with the call center. The call center may transmit the authenticated start command ASC after initiation from the smart phone 50 with verified physical presence of the smart phone 50 as disclosed above. The transmission of the start command is shown at reference numeral 214.

Upon receiving the authenticated start command ASC, the starting system 36 enters the geo-bounded on state ON S, as shown at reference numeral 216. In the geo-bounded on state ON S, the vehicle 12 is operable within the predetermined geographical boundary. During operation of the vehicle 12 in this state ON S, the position, and in some instances speed, is/are monitored by the in-vehicle systems (e.g., unit 32 and/or sensors 44), and the data is periodically transmitted to the processor 28 or 35. The processor 28 or 35 compares the received data with the preset boundary (and speed, where appropriate) and determines if the vehicle has ventured outside, beyond, or off of the predetermined boundary (as shown at reference numeral 218). As long as the vehicle 12 does not venture outside of the predetermined geographical boundary, the vehicle 12 will remain operable until the vehicle 12 is put into park mode, at which point the method ends (reference numeral 220) or continues at reference numeral 202.

At reference numeral 218, if the processor 28 or 35 recognizes that the vehicle 12 has ventured outside or off of the predetermined geographic boundary (PGB), an off signal will be transmitted to or recognized by the starting system 36, which will initiate the transition to the geo-bounded off state OFF S.

In the example shown in FIG. 2, the starting system 36 will first enter the transition state TS. During the transition state (as shown at reference numeral 222), it is determined whether certain predetermined conditions are met before the geo-bounded off state OFF S is finally entered (reference numeral 224). If the predetermined conditions are not met, the starting system 36 will remain in the transition state TS until the predetermined condition(s) is/are met. As discussed above, the predetermined condition may include an alert that is transmitted within the vehicle 12 to the in-vehicle occupant(s) and/or an exterior alert, such as flashing of the hazards. Also during the transition state TS, the vehicle 12 may be slowly decelerated so that the transition to the geo-bounded off state OFF S is smooth and the vehicle 12 is not stopped abruptly. These predetermined condition(s) may be initiated by suitable vehicle systems once the starting system 36 recognizes/receive the off signal.

Once the predetermined condition(s) is met, the starting system 36 enters the geo-bounded off state OFF S (reference numeral 226), and the vehicle power plant 39 is no longer able to able to provide tractive power to the drive wheel(s) 46 and the vehicle 12 stops. When the geo-bounded off state OFF S is entered, the starting system 36 will remain in the off state until the starting system 36 recognizes the authenticated start command ASC from the smart phone 50 (i.e., steps 202, 208, and 212 through 214 are repeated) or recognizes the physical presence of the hardware key (steps 202 through 204).

In the example shown in FIG. 2, after the vehicle 12 is stopped, a message may be communicated from the vehicle 12 to a predetermined receiver (e.g., the authorized phone 50 of the vehicle owner, an email account associated with the vehicle owner, a call center associated with the vehicle telematics service provider, etc.). The message includes a location of the vehicle 12 when the geo-bounded off state is entered. This message will inform the vehicle owner and/or the call center the location of the stopped vehicle 12.

In describing and claiming the examples disclosed herein, the singular forms "a", "an", and "the" include plural referents unless the context clearly dictates otherwise.

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

The invention claimed is:

1. A remote start system for a motor vehicle, comprising:
a vehicle power plant disposed in the motor vehicle;
an electronic vehicle geographic location system disposed in the motor vehicle;
a starting system connected to the vehicle power plant and in communication with the electronic vehicle geographic location system, the starting system including:
a geo-bounded on state electrically enabling the vehicle power plant to provide tractive power to a vehicle drive wheel as long as the motor vehicle remains within a predetermined geographical boundary;
a geo-bounded off state electrically disabling the vehicle power plant from providing tractive power to the vehicle drive wheel or an other vehicle drive wheel when the motor vehicle is not within the predetermined geographical boundary; and
a normal state overriding the geo-bounded off state and the geo-bounded on state to electrically enable the vehicle power plant to provide tractive power to the vehicle drive wheel, wherein a hardware key must be within a predetermined distance of the starting system for the starting system to be in the normal state and wherein the hardware key is not required for the starting system to enter the geo-bounded on state; and
a smart phone in electromagnetic communication with an authentication system of the starting system, wherein the starting system enters into the geo-bounded on state only in response to an authenticated start command from the smart phone.

2. The remote start system as defined in claim 1 wherein a vehicle speed is limited to a predetermined maximum vehicle speed as long as the starting system is in the geo-bounded on state.

3. The remote start system as defined in claim 1 wherein the authenticated start command is blocked by the authentication system until a physical presence of the smart phone at the vehicle is verified by the authentication system.

4. The remote start system as defined in claim 1, further comprising a block mode of the authentication system, the block mode blocking the authenticated start command until a message including a passphrase is received at the motor vehicle from the smart phone.

5. The remote start system as defined in claim 1 wherein the starting system enters into the normal state only in response to an other authenticated start command.

6. The remote start system as defined in claim 1 wherein the starting system further includes a transition state between the geo-bounded on state and the geo-bounded off state, the transition state delaying entry into the geo-bounded off state until predetermined conditions are met.

7. The remote start system as defined in claim 6, further comprising:
an in-vehicle display; and
a message displayed on the in-vehicle display when the starting system is in the transition state.

8. The remote start system as defined in claim 6 wherein the starting system includes:
a micro-processor; and
computer-readable code stored on a non-transitory, tangible computer-readable medium, the computer-readable code being executable by the micro-processor and including computer-readable code for initiating any of the geo-bounded on state, the geo-bounded off state, the normal state, and the transition state.

9. The remote start system as defined in claim 1, further comprising a message communicated from the motor vehicle to a predetermined receiver, the message including a location of the motor vehicle when the geo-bounded off state is entered.

10. The remote start system as defined in claim 1 wherein:
the authentication system includes a list of authorized smart phones having been authorized to give the authenticated start command; and
the list includes a unique identifying code for each authorized smart phone.

11. A method for remotely starting a motor vehicle, comprising:
failing to recognize a physical presence of a hardware key at the motor vehicle;
verifying a physical presence of a smart phone by an authentication system of a starting system of the motor vehicle, the starting system operatively connected to a vehicle power plant and having:
a geo-bounded on state electrically enabling the vehicle power plant to provide tractive power to a vehicle drive wheel as long as the motor vehicle remains within a predetermined geographical boundary;
a geo-bounded off state electrically disabling the vehicle power plant from providing tractive power to the vehicle drive wheel or an other vehicle drive wheel when the motor vehicle is not within the predetermined geographical boundary; and
a normal state overriding the geo-bounded off state and the geo-bounded on state to electrically enable the vehicle power plant to provide tractive power to the vehicle drive wheel, wherein a hardware key must be within a predetermined distance of the starting system for the starting system to be in the normal state and wherein the hardware key is not required for the starting system to enter the geo-bounded on state;
in response to verifying the physical presence of the smart phone, establishing a communication link between the starting system and the smart phone;
transmitting an authenticated start command from the smart phone to the starting system; and
in response to the authenticated start command, the starting system entering the geo-bounded on state.

12. The method as defined in claim 11, further comprising:
transmitting an off signal to the starting system; and
in response to the off signal, the starting system enters the off state and remains in the off state until the starting system recognizes the authenticated start command from the smart phone or recognizes the physical presence of the hardware key.

13. The method as defined in claim 11, further comprising limiting a vehicle speed to a predetermined maximum vehicle speed as long as the starting system is in the geo-bounded on state, the limiting being accomplished by a micro-processor of the motor vehicle that is running computer-readable code stored on a non-transitory, tangible computer-readable medium.

14. The method as defined in claim 11 wherein the verification of the physical presence of the smart phone is accomplished by:
   recognizing that the smart phone is a pre-authorized smart phone;
   transmitting a request for authorization from the motor vehicle to the pre-authorized smart phone, the request including a passphrase; and
   receiving, at the motor vehicle, a message from the pre-authorized smart phone in response to the request, the message including the passphrase.

15. The method as defined in claim 11 wherein the verification of the physical presence of the smart phone is accomplished by:
   recognizing that the smart phone is a pre-authorized smart phone;
   unlocking the motor vehicle;
   displaying a request for authorization on an in-vehicle display, the request including a passphrase; and
   receiving, at the motor vehicle, a message from the pre-authorized smart phone in response to the request, the message including the passphrase.

16. The method as defined in claim 11, further comprising:
   recognizing, by an electronic vehicle geographic location system disposed in the motor vehicle, that the predetermined geographical boundary have been exceeded by the motor vehicle; and
   entering a transition state between the geo-bounded on state and the geo-bounded off state to delay entry into the geo-bounded off state until predetermined conditions are met.

* * * * *